(12) United States Patent
Sachs et al.

(10) Patent No.: US 8,400,914 B2
(45) Date of Patent: Mar. 19, 2013

(54) METHOD AND APPARATUS FOR ACCESS SELECTION IN A MULTIACCESS COMMUNICATIONS SYSTEM

(75) Inventors: Joachim Sachs, Aachen (DE); Per Magnusson, Linköping (SE); Mikael Prytz, Rönninge (SE); Teemu Rinta-Aho, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 874 days.

(21) Appl. No.: 12/439,465

(22) PCT Filed: Aug. 31, 2006

(86) PCT No.: PCT/SE2006/050307
§ 371 (c)(1),
(2), (4) Date: Feb. 27, 2009

(87) PCT Pub. No.: WO2008/026978
PCT Pub. Date: Mar. 6, 2008

(65) Prior Publication Data
US 2010/0014470 A1    Jan. 21, 2010

(51) Int. Cl.
*G01R 31/08* (2006.01)
(52) U.S. Cl. .................. 370/230; 370/329
(58) Field of Classification Search ............. 370/329, 370/230
See application file for complete search history.

(56) References Cited

U.S. PATENT DOCUMENTS

| 2002/0102987 | A1* | 8/2002 | Souisse et al. | 455/454 |
| 2005/0181799 | A1* | 8/2005 | Laroia et al. | 455/450 |
| 2005/0282544 | A1* | 12/2005 | Oommen et al. | 455/432.1 |

FOREIGN PATENT DOCUMENTS

| GB | 2398705 A | 8/2004 |
| WO | 2006/028409 A1 | 3/2006 |

OTHER PUBLICATIONS

Papadopoulou, L.-M. et al. "A Framework to Service and Network Resource Management in Composite Radio Environments." Proceedings of the Second International IFIP-TC6 Networking Conference on Networking Technologies, Services, and Protocols; Performance of Computer and Communication Networks; and Mobile and Wireless Communications, London, UK, 2002.
Berggren, F. et al. "Multi-Radio Resource Management for Ambient Networks." Internet article available at: http://www.ambient-networks.org/phase1web/publications/Multi_Radio_Resource_Management_for_Ambient_Networks.pdf, Sep. 2005.
Gustafsson, E. et al. "Always Best Connected." IEEE Wireless Communications, Feb. 2003, pp. 49-55.

* cited by examiner

*Primary Examiner* — Sai-Ming Chan
(74) *Attorney, Agent, or Firm* — Coats & Bennett, P.L.L.C.

(57) ABSTRACT

The present invention relates to communications systems comprising multiple access technologies, and more especially it relates to access technology allocation of communications in such communications systems. Particularly, it relates to allocation of a plurality of communication flows to one or more of a plurality of access technologies available in the communications system. Access selection based upon stored one or more preference values is disclosed.

27 Claims, 4 Drawing Sheets

| Entry | Access Technology | Preference Value | Related Flow Bundle |
|---|---|---|---|
| 1 | $A_1$ | +2 | $\{f_1\}$ |
| 2 | $A_3$ | -5 | $\{f_1\}$ |
| 3 | $A_5$ | +1 | $\{f_1, f_3\}$ |
| 4 | | | |

| Entry | Access Technology | Preference Value | Related Flow Bundle |
|---|---|---|---|
| 1 | $A_1$ | +2 | $\{f_1\}$ |
| 2 | $A_3$ | -5 | $\{f_1\}$ |
| 3 | $A_5$ | +1 | $\{f_1, f_3\}$ |
| 4 | | | |

| Entry | Access Technology | Preference Value | Related Flow Bundle |
|---|---|---|---|
| 1 | $A_1$ | +1 | $\{f_1, f_2\}$ |
| 2 | $A_3$ | -5 | $\{f_1\}$ |
| 3 | $A_5$ | +3 | $\{f_1\}$ |
| 4 | | | |

Fig. 4

| Entry | Access Technology | Preference Value | Direction Indicaator | Rate Requirement | Related Flow Bundle |
|---|---|---|---|---|---|
| 1 | $A_1$ | +5 | Uplink | 64 kbit/s | $\{f_1\}$ |
| 2 | $A_3$ | -5 | – | – | $\{f_1\}$ |
| 3 | $A_5$ | +2 | Downlink | Best Effort | $\{f_2, f_3\}$ |
| 4 | | | | | |

METHOD AND APPARATUS FOR ACCESS SELECTION IN A MULTIACCESS COMMUNICATIONS SYSTEM

TECHNICAL FIELD

The present invention relates to communications systems comprising multiple access technologies, and more especially it relates to access technology allocation of communications in such communications systems. Particularly, it relates to allocation of a plurality of communication flows to one or more of a plurality of access technologies available in the communications system. Such technologies include, e.g., wireless access technologies such as radio access technologies and optical access technologies.

BACKGROUND

Communications comprising a plurality of access technologies have received great interest. Well known examples are dual mode telephones such as DECT/GSM phones and GSM/WCDMA phones. DECT (Digital Enhanced Cordless Telephone) is a radio access technology, RAT, applying Gaussian Minimum Shift Keying, GMSK, combining 10 carriers of frequency division multiplex, FDM, and 12 slots of time division multiplex, TDM, for each of uplink and downlink directions applying time division duplex, TDD, sending uplink and downlink communications separated in time. GSM (Global System for Mobile Communications) also applies GMSK, FDM and TDM but, in contrast to DECT, applies frequency division duplex, FDD, sending communications in uplink and downlink directions on different frequencies. WCDMA (Wideband Code Division Multiple Access) also separates uplink and downlink directions in frequency in FDD-mode of UMTS, applying code division multiple access for multi-user access.

Ouyang Congxing, Wang Bin, Wang Xiaoqi, Wei Bing and Huang Yuhong, 'An analysis of radio handover success ratio,' Huawei Technologies, November 2005, Issue 19, analyzes factors that may affect handover success ratio with inter-RAT handover. The inter-RAT handover includes the steps of
1. Measurement;
2. Judgement; and
3. Implementation.

The Measurement step teaches about signal level, signal quality and synchronization information of target RAT. In the Judgement step, the Measurement results are reported to the source side, or source RAT. The source side or the terminal may determine on whether or not to actually handover to the target RAT. In the latter case, the terminal will directly establish the connection with the target side wireless system cell. In the former case, the source side notifies the target side to prepare the corresponding channel resource and then the source side system issues the handover command to notify the terminal to transfer to the target side wireless system. The authors conclude that network planning will be crucial, including settings of proper handover judgment thresholds and handover delay time. A fast fading signal at the target side is a primary reason for inter-RAT handover failure.

Eva Gustafsson, Annika Jonsson, 'Always Best Connected,' *IEEE Wireless Communications*, February 2003, describes the concept of Always Best Connected, ABC. The paper discusses user experience and business relationships to broaden third generation cellular systems, 3G, such as Universal Mobile Telecommunications System (UMTS) or CDMA2000. The fundamentals of the ABC concept are that a user shall always be connected through the best available device and access technology at all times. The definition of best, the B in ABC, depends on a number of different aspects such as personal preferences, size and capabilities of the device, application requirements, security, operator or corporate policies, available network resources and network coverage. Depending on the applications and user preferences, a user can be connected over one access at a time or over multiple accesses in parallel. The ABC concept holds for virtually all types of access technologies including those that are yet to come. In its simplest form, an ABC service provides the user with capabilities to access services of different types of network technologies, without mobility support. Gustafsson and Jonsson describe example scenarios of a user named Hubert. In one scenario Hubert has a PDA (Personal Digital Assistant) and a laptop, both of which have built-in 3G capabilities. In another scenario the laptop and the PDA are part of Hubert's personal area network, PAN, communicating over short-range radio technology, e.g. Bluetooth. In the example, the PAN also includes Hubert's 3G mobile phone. An ABC terminal may be inclusive or exclusive of access devices. In the former case, the terminal performs access discovery periodically and at startup to find out the best available access technology. In the latter case, the access discovery is an internal functionality of the device as long as there is only one device. When there is a plurality of devices including access devices connected in a PAN, the ABC terminal needs to find out which access devices are available in the PAN. Key issues for providing ABC access discovery for a PAN are:

- Defining a generic set of parameters describing access networks and devices. Examples of such parameters are type of access network technology, access network operator, QoS (Quality of Service), current cost for a particular user to connect over a particular network, type of access device, and type of connectivity the access device can offer;
- Investigating how the statistics of the access networks should be collected, e.g. in terms of measurements, information from operators and so on;
- In a PAN, handling the dynamics of the PAN in terms of access devices becoming available or unavailable as the PAN configuration changes.

Access selection refers to the process of deciding over which access network to connect at any point in time. Gustafsson and Jonsson identify three parts of such a process:
1. Terminal-based selection;
2. Network-based selection; and
3. User intervention.

When selecting access network, a number of different aspects are considered, such as ABC user preferences, service provider preferences, available bandwidth, cost and operator, device capabilities and application requirements. An ABC terminal needs a stored profile or priority list, or default setting for choosing access network at startup or reconnection. Otherwise, it cannot benefit from any network-based functionality. A benefit of network-based support for access selection, or network-based access selection is that an ABC service provider could transfer network-specific information to the terminal. Network-based access selection allows for load balancing, and may reduce signaling over the radio interface if the selection process requires repeated inquiries to databases in the network. Network-based support for access selection makes it possible to perform radio-resource-efficient selection in order to maximize total system throughput.

Gustafsson and Jonsson describe different approaches for content adaptation.

1. One approach is for an application to detect changes in network characteristics and/or device capabilities and request the application server to adapt the contents accordingly.
2. A second approach is for the terminal to provide information about the access network and device to either of the application, the application server, or databases and servers in the ABC service provider network.
3. A third approach is to let the access network provide information to the application server and/or the device regarding network characteristics (e.g., notification of QoS changes).

Bo Xing and Nalini Venkatasubramanian, 'Multi-Constraint Dynamic Access Selection in Always Best Connected Networks,' Proc. of The Second Annual Int. Conf. on Mobile and Ubiquitous Systems: Networking and Services, Volume 00, 2005, Jul. 17-21, 2005, pp. 56-64, addresses the problem of dynamic access selection, the concept of ABC enabling a new paradigm in fourth generation mobile communication, 4G, systems. The authors model the problem of multi-constraint dynamic access selection, MCDAS, as a variant of bin packing problem. A series of approximation algorithms derived from the First Fit Decreasing, FFD, algorithm are proposed for finding near-optimal solutions in access selection comprising various access technologies, such as Wi-Fi, Bluetooth, GPRS and UMTS, simultaneously available to mobile devices.

The optimizations incorporate the ability to adapt to varying load conditions as well as dynamic network parameter changes caused by device mobility. The proposed algorithms are compared to a quasi-optimal off-line solution, obtained assuming full knowledge of all traffic flows for a set of inputs.

Access preference of a flow describes which access network is preferred by a traffic flow and to which extent. A power consumption cost model calculates the power consumption of a particular flow, $f_i$, using a particular access network, $A_j$. A dissatisfaction value of each traffic flow assignment describes the degree to which the assignment does not match the flow's access preference.

A bin packing problem, packing items into smallest number of bins of given maximum size, is called on-line if every item is packed without information on subsequent items, while an off-line problem allows decisions to be made with full knowledge of all items.

FFD is a well-known algorithm for off-line packing items in bins, of given maximum size packing the largest item into the first bin which has enough remaining room, when the bins are ordered in sequence of decreasing fill-level (increasing remaining room).

G. P. Koudouridis, P. Karlsson, J. Lundsjö, A. Bria, M. Berg, L. Jorguseski, M. Meago, R. Agüero, J. Sachs., R. Karimi, 'Multi-Radio Access in Ambient Networks,' IST EVEREST Workshop, Barcelona, Spain, November 2005, illustrates multi-radio access, MRA, for addressing the dynamics of ambient networks, ANs. Accessing any network, public or private, possibly without subscription, through instant establishment of inter-network agreements is one of the strategic objectives of The Ambient Networks project, an integrated project within The EU $1^{st}$ $6^{th}$ Framework Program. Koudouridis et al. provide an overview of evaluation studies for multi-radio access selection, MRAS, in terms of efficient radio resource utilization.

For radio access selection, Koudouridis et al. propose a hierarchical distribution of functionality between multi-radio resource management, MRRM, and generic link layer, GLL, where the GLL dynamically handles mapping of data flows to radio accesses, RAs, selected by MRRM. The criteria used for selection of access include: radio link characteristics, cell load and capacity, RAT preferences, terminal capabilities, terminal velocity, service type and required QoS. Multi-radio transmission diversity, MRTD, essentially refers to system capability of selecting on a relatively fine time-scale among plural radio accesses for transmission of user data. Ultimately, MRTD selects radio access on a per packet basis.

None of the cited documents above discloses a method and system of access selection with flow bundling constraints, the access selection determining and including one or more metrics in an access preference list of a Communications Flow Correlation Module.

SUMMARY

A communication flow is a stream of communicated information. When there is a plurality of concurrent such streams they are generally referred to as flows or communication flows. Prior-art solutions of access selection are either substantially simplified and restricted to individual communication flows, or arrive at excessive processing requirements when considering a plurality of communication flows seeking global optimization. The invention identifies a need for both considering a plurality of communication flows when allocating the flows to one or more access technologies, and a need for reduced processing requirements and adaptations to existing application program interfaces, APIs, when facing the problems of implementing multi-access systems.

It is, consequently, an object of preferred embodiments of the invention to provide a method and system for sequential access selection.

It is also an object of preferred embodiments of the invention to provide a method and system for access selection adapted for coordinated allocation of communication flows.

A further object of embodiments of the invention is to facilitate fast allocation of communication flows associated with particular requirements for appropriate access selection.

Finally, it is an object of embodiments of the invention to enable adaptation to changing conditions and requirements in a multi-access communications environment.

These objects are met by a method and system of access technology selection, allocating a plurality of communication flows to one or more of a plurality of access technologies included for communications in a communications system by means of stored allocation preference values.

Preferred embodiments of the invention, by way of examples, are described with reference to the accompanying drawings below.

BRIEF DESCRIPTION OF THE DRAWINGS

FIG. 1 illustrates example preference values stored in memory, in the figure represented by a table, according to the invention.

FIG. 3 illustrates updated example memory content, represented in the figure by a preference value table, according to the invention.

FIG. 4 shows for an example embodiment of the invention extension of memory storage, as represented by tables in FIGS. 1 and 3, to provide for additional information qualifiers.

DETAILED DESCRIPTION

Figure 2:
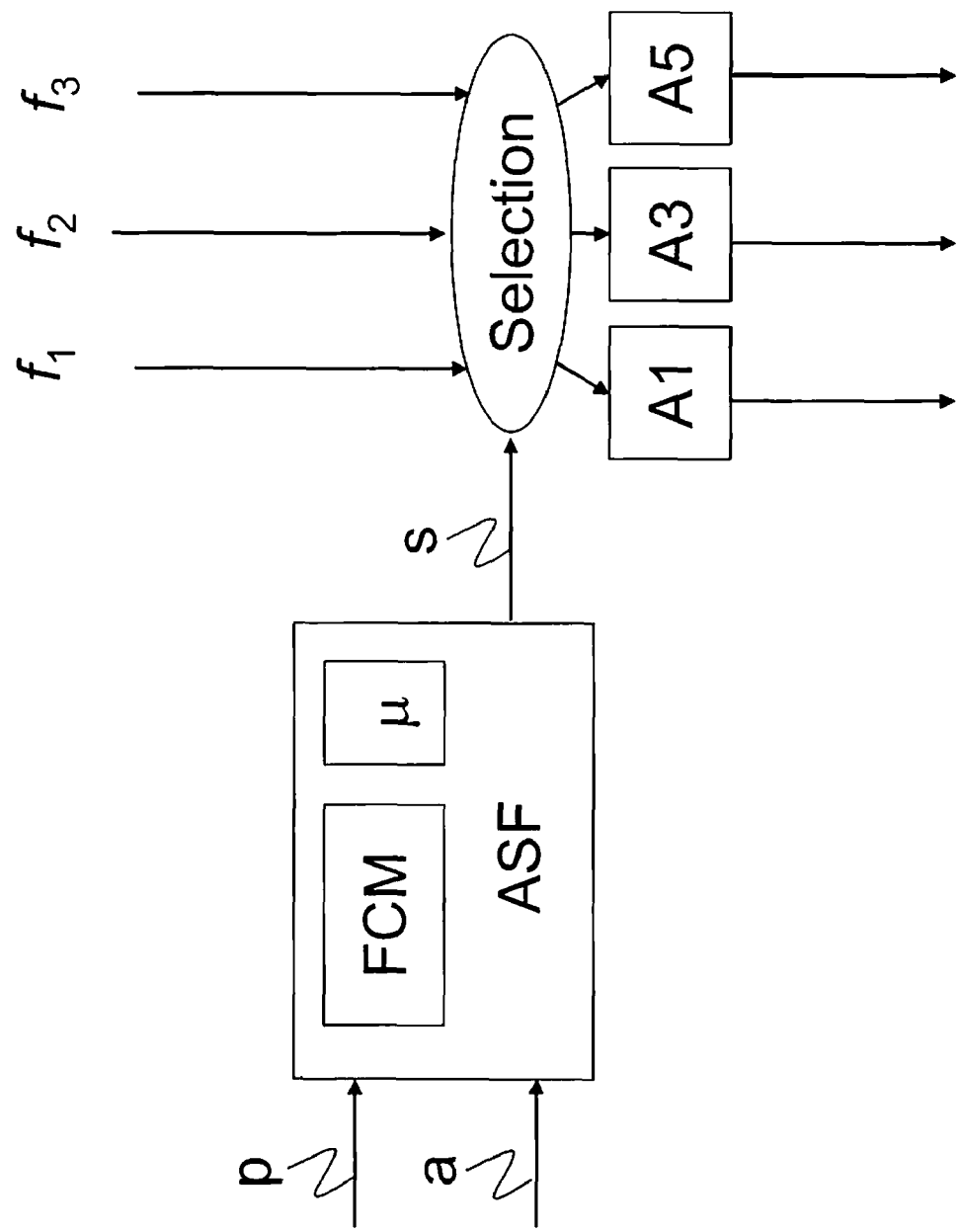
FIG. 2 demonstrates schematically access selection functionality equipment according to the invention.

In the following description, for purpose of explanation, specific details are set forth such as particular architectures, interfaces, techniques, etc. in order to provide a thorough understanding of the present invention. However, it will be apparent to those skilled in the art that the present invention may be practiced in other embodiments that depart from these specific details.

In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

The invention discloses access selection in a communications system, wherein a user terminal or PAN has two or more communications flows and there are two or more access technologies available.

Interdependencies tend to cause problem when selecting accesses technologies for individual flows. A selection decision is likely to affect other, future or past, access selections.

The following examples illustrate some sampled situations.

1. A candidate access technology is selected for a first downlink flow (in direction towards user terminal or PAN). This flow is subsequently mapped to a particular access configuration of the selected access technology, e.g. a Radio Access Bearer, RAB, of access technology WCDMA. The access configuration may be specified, e.g. in technical system specifications or standards, to also require resources for uplink direction. Such access mapping, once the access technology is selected, is not always under control of the multi-access selection functionality. Selection of the particular access technology is thereby inefficient given the conditions of the communication flows and access technologies.
2. An access technology is selected for a first communications flow. The flow is mapped to an access configuration, e.g. a best effort bearer, which is not under control of the multi-access selection functionality. Selection of the particular access technology thereby introduces inefficiency, since the mapping may not fulfill requirements of the communication flow.
3. An access technology is selected for a first flow and the access technology is available for the user terminal. If however, two different access technologies cannot be applied simultaneously due to e.g. interference or terminal limitations; there may be need for the flow to be reallocated if there is more than one flow to allocate. The additional (re-)allocation introduces allocation inefficiency.

The sample situations illustrate the need for ranking of access selection preferences in relation to various access technologies or communication flows. According to the invention, interdependencies between access selection decisions for individual communication flows are expressed as constraints, or preferences, for access selection decisions that relate to groups, or bundles, of communication flows.

The access selection decisions of the various flows of a group or bundle of flows are often separated in time and cannot be considered simultaneously, in order not to introduce excessive communication delay. User communication flows start and stop more or less randomly from a system perspective, and as they do so, access (re-)selection decisions need be made. To improve established access selection allocations, it is advantageous to evaluate assignments from a "global" perspective, considering many, if not all, established access selection decisions concerning flow bundles of a particular user terminal or PAN, and possibly also all user terminals/PANs. The considerable time required for a perfect access selection allocation opts for improvements to render the access selection feasible for real time applications.

A first example embodiment of the invention provides for a method and system for access selection of communications flows, such that decisions can be made efficiently for individual flows. This is a achieved by reflecting dependencies between access selection decisions through preference values of communication flows in relation to various bundles of communication flows. Each preference value corresponds to a utility value for a particular communication flow, indicating the preference of the allocation in relation to other allocations to the particular one or more bundles, which the preference value refers to.

FIG. 1 illustrates example preference values stored in memory, e.g. random access memory, RAM, in the figure represented by a table, according to the first example embodiment. In the memory various access technologies are included with a preference value. When considering an access technology $A_1$ for allocation of a communication flow, the preference value is consulted. The preference value of access technology $A_1$ is positive (+2) and indicates a positive utility of allocating additional one or more communication flows to the access technology. In accordance with the figure, also another access technology $A_3$ is included in memory and considered for allocating of the flow prior to making the selection decision. However, the preference value of access technology $A_3$ is negative (−5) and indicates that further allocation of communication flows to the access technology would have an adverse effect on system performance. Also a third access technology $A_5$ is included in memory together with an associated preference value (+1). In the example of FIG. 1, communication flow $f_1$ is allocated to access technology $A_1$. Allocation of communication flow $f_1$ to access technology $A_1$ has an adverse effect on allocation of future communication flows to access technology $A_3$ due to interference, rendering the preference value of access technology $A_3$ negative (−5).

Allocation of communication flow $f_1$ to access technology $A_1$ also affects a third access technology $A_5$ and affects another communication flow $f_3$ allocated to $A_5$. This impact is included in the memory, represented by the table, as a related flow in a flow bundle. By inclusion of related flows in bundles, as illustrated in the example in FIG. 1, a plurality of flows in a flow bundle can be considered.

The stored preference values, such as the one illustrated in the table of FIG. 1, consequently comprises a number of entries. According to the first example embodiment as illustrated in FIG. 1, there is one entry for each access technology that is available for assignment of future communication flows. According to example embodiments described in further detail below more than one entry for each access technology is not excluded.

If an allocation selection decision is such that there is still a preference of using the allocated access technology also for future allocations of communication flows, the preference value is positive. The greater the positive value, the greater is the preference.

If an allocation selection decision is such that it has a negative impact on future allocations to the particular access technology for future allocations of communication flows, the preference value is negative. The greater the magnitude of the negative value, the greater is the adverse effect of selecting the access technology for future communication flows.

A zero preference value indicates a neutral preference to allocating future communication flows to the particular access technology.

According to the first example embodiment of the invention, the preference values are used as input to access selection functionality equipment, ASF, included in or connected to a user terminal or PAN. In one example implementation it is included in a radio access network. In another example implementation it is included in a control unit of a communications system. The ASF is schematically illustrated in FIG. 2.

Preference values <<p>> are input to access selection functionality equipment <<ASF>>. A flow correlation module <<FCM>> for each user terminal or PAN preferably represents preference values of access selection decisions in a lookup table temporarily stored in memory connected to a processing entity <<μ>> of the access selection functionality equipment <<ASF>>. The values <<p>> are optionally combined with other access selection criteria <<a>>. The access selection functionality equipment <<ASF>> outputs a selection decision <<s>> for each of the flows <<$f_1$>>, <<$f_2$>>, <<$f_3$>> to be allocated to at least one access technology <<$A_1$>>, <<$A_3$>>, <<$A_5$>>.

When an access selection decision is requested for a second flow $f_2$, the stored preference values, similar to those in the table of FIG. 1, are consulted. When a candidate access technology, e.g. access technology $A_1$, is evaluated by the ASF, the corresponding preference value in the list is used. If the candidate access technology is actually allocated to the flow $f_2$, the flow bundle is augmented to include the allocated flow $f_2$. When a flow is terminated and ends, the flow is also removed from the flow bundle of the access technology. If the flow bundle set is empty, the entry for the access technology is preferably removed from memory. The ASF equipment is preferably applied also for example embodiments of the invention described below.

FIG. 3 illustrates updated example memory content, represented in the figure by a preference value table. The table representation illustrates an actual example allocation when a flow $f_2$ has started and flow $f_3$ has ended since the allocation was made as schematically represented in FIG. 1. In the table representation, flow $f_2$ has augmented the set of related flows related to access technology $A_1$. Flow $f_3$ has been excluded from the set of flows related to access technology As. The preference values have been adjusted accordingly.

In a second example embodiment, the entries in memory comprise additional information indicators. Non-exclusive examples of such information indicators are whether the various flows are directed from or towards the user terminal or PAN, i.e. whether they are in uplink or downlink direction, respectively, or whether the various communication flows require a particular minimum bit rate or are best effort communication flows.

Also for the second example embodiment, the preference values in memory are considered when allocating a communication flow to an access technology. In the second example embodiment, however, the additional information indicators are also consulted for a match to the corresponding prerequisites of the flow to be allocated. The updating of the set of flows that are affected by an access technology being allocated to a future allocation of one or more communication flows is similar to the updating described for the first example embodiment and FIGS. 1 and 3. However, since there are one or more information indicators, there is typically more than one entry for at least some access technology. There may still be situations, though, when there are only single occurrences of included one or more access technologies.

In FIG. 4, the table representation of FIGS. 1 and 3 is extended by two columns representing information qualifiers <<Direction Indicator>>, <<Rate Requirement>>. The figure illustrate an example allocation, where access technology $A_1$, was selected for downlink flow $f_1$, the access technology providing a bi-directional bit rate of at least 64 kbit/s and the flow $f_1$ being in downlink direction. Example entry number 1 of FIG. 4 reflects that it is advantageous to allocate future flows in downlink direction requiring at most 64 kbit/s to access technology $A_1$. Also with reference to the example situation illustrated in FIG. 4, interference between access technologies $A_1$ and $A_3$ are supposed to be known to interfere. Consequently, in entry number 2, access technology $A_3$ is indicated as being related to the communication flow $f_1$.

For communication flows $f_2$ and $f_3$ access technology $A_2$ has been selected for best effort communication flows in downlink direction. Due to the remaining positive preference value, also future communication flows in uplink direction for best effort are likely to be allocated to access technology $A_2$.

An application programming interface, API, is the interface that a computer system, library or application provides in order to allow requests for services to be made of it by other computer programs, and/or to allow data to be exchanged between them. Existing APIs for applications to request communication flow setup are typically written such that one flow is set up at a time. When a plurality of communication flows are set up, this is made by sequentially setting up the individual communication flows. When an application requires a plurality of communication flows, this imposes additional challenges when it comes to access technology selection, e.g. when the existing application including the API is used in a (new) ABC environment.

The invention identifies that implementation and performance gains are achieved by a particular method and system of ordering of the communication flows.

According to a third example embodiment of the invention, the communication flows of a multi-flow session are setup and ordered according to one or more predefined criteria for access technology selection. When sequentially ordered according to the one or more predefined criteria, the communication flows are preferably allocated to the various access technologies, allocating the flows with greatest requirements (e.g. greatest required bit rate) first. As a non-exclusive example, the communication flows are ordered according to bit rate requirements. Another non-exclusive example ordering criterion is direction requirement (uplink/downlink). A further non-exclusive criterion for ordering is candidate preference values, as will be described in detail below in relation to a fourth and fifth example embodiment of the invention.

According to a fourth example embodiment of the invention, the access technology allocation process is divided into two phases.

1. In the first phase, a preliminary allocation is executed where each communication flow is preliminarily allocated to the various access technologies as described for the example embodiments above. For the preliminary candidate allocations, the preference values are determined and updated as if the communication flows were actually allocated to the various access technologies. During the first phase such preliminary candidate allocations are preferably executed for all communication flows for which an allocation technology should be selected. For each communication flow the greatest increase of preference value is stored in memory as the access technologies are investigated.

2. In the second phase, the preference value increases stored during the first phase are ordered according to their size.

The flows providing the greatest preference value increases are preferably allocated first, thereby improving efficiency of access technology utilization.

Figure 5:
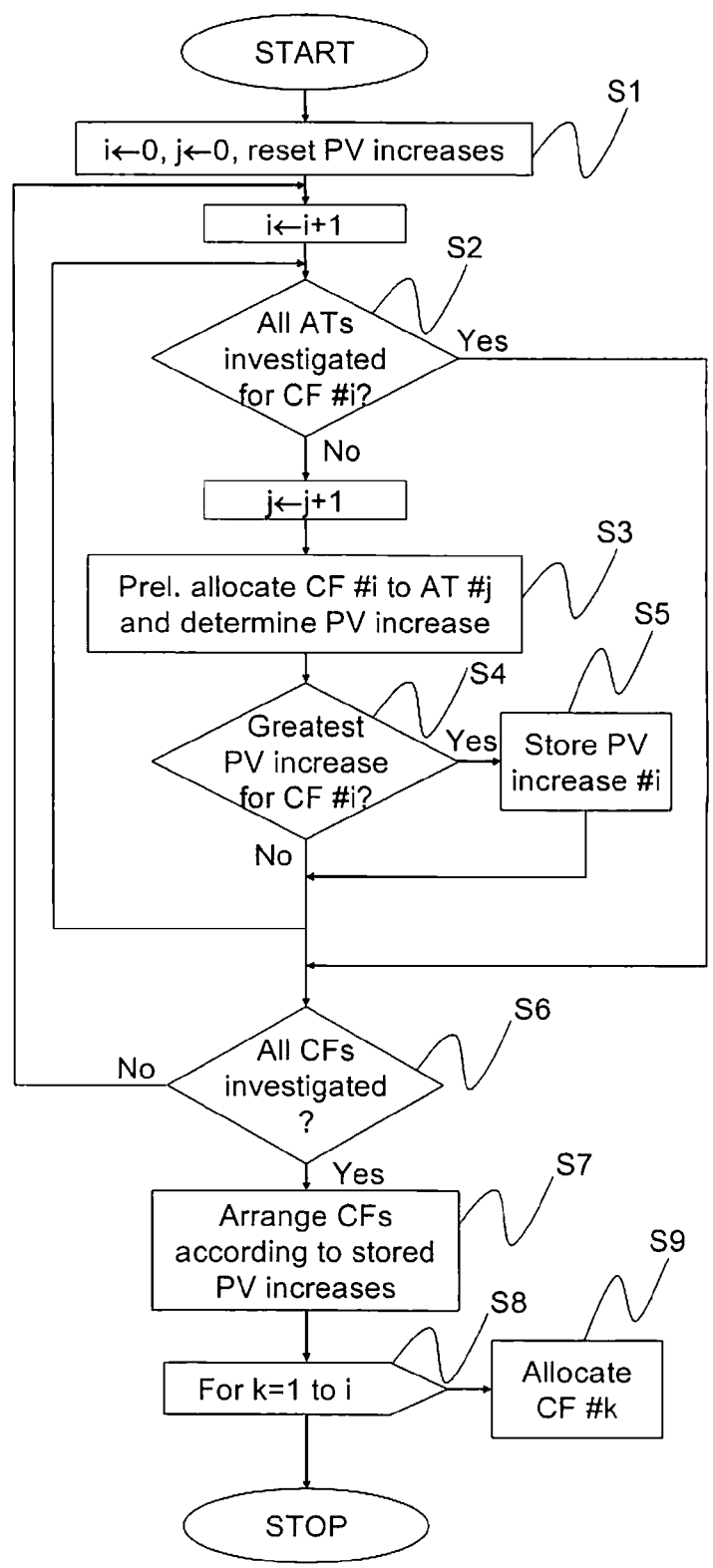
FIG. 5 demonstrates a flow chart schematically illustrating a fourth example embodiment of the invention.

FIG. 5 schematically illustrates a flow chart describing the fourth example embodiment. In a first step <<S1>> counters and preference value increases are reset. For each communication flow <<CF>>, the access technologies <<ATs>> are looped through <<S2>>. For each communication flow <<CF #i>> and access technology <<AT #j>>, a preliminary allocation and preference value <<PV>> increase is determined <<S3>>. For each communications flow <<CF #i>, the greatest preference value increase <<PV increase #i> is stored <<S5>>. The preliminary allocation is executed for all communication flows to be allocated <<S6>>. When all communications flows of interest have been preliminary allocated, the communication flows are arranged according to their greatest preference value increase <<S7>>, as stored <<S5>>. The ordered list of communication flows is then looped through <<S8>> and the various communication flows are allocated to an access technology <<S9>>.

According to a fifth example embodiment of the invention, the preliminary candidate allocation of flows as described in relation to the fourth example embodiment is extended and executed for bundles of flows. After a first communication flow of the bundle has been preliminarily allocated as described for the fourth example embodiment above, the process is repeated for the second communication flow of the bundle. Consequently, the required memory capacity for storage of preference values increases exponentially with the number of flows. In a typical and interesting situation, however, the number of flows of interest is two, limiting the memory requirement to the square of the memory capacity required for the fourth example embodiment. The required memory capacity could generally be halved due to symmetries in allocation preference values. The greatest preference value increase is then, unless redundant utilizing symmetries, stored for each pair of flows. The stored preference values are then ordered according to their sizes for allocation of access technology as described for the fourth example embodiment.

The example embodiments described above have been described in relation to a single user terminal or PAN. The advantages achieved from the preference values are further explored in a method and system considering a plurality of user terminals and PANs for globally efficient access technology allocation, thereby substantially reducing the complexity of access technology selection described in prior art cited above. The complexity reduction would render global or at least local access selection, for a limited number of user terminals and PANs, feasible and would also allow regular access reselection with available processing capacity of today.

A person skilled in the art readily understands that the receiver and transmitter properties of, e.g., a user equipment are general in nature. The use of concepts such as access selection functionality equipment, ASF equipment, application program interfaces, APIs, or radio access technology, PAT, within this patent application is not intended to limit the invention only to devices associated with these acronyms. It concerns all devices operating correspondingly, or being obvious to adapt thereto by a person skilled in the art, in relation to the invention.

The invention is not intended to be limited only to the embodiments described in detail above. Changes and modifications may be made without departing from the invention. It covers all modifications within the scope of the following claims.

The invention claimed is:

1. A method of access selection in a multi-access communications system for allocating one or more communication flows to one or more of a plurality of access technologies, the method comprising, for one or more of the communication flows:
    determining one or more preference values of each of the plurality of access technologies, the preference values reflecting whether it is advantageous to allocate additional communication flows to the access technology; and
    storing the preference values.

2. The method of claim 1 wherein storing the one or more preference values comprises storing a preference value linked to a bundle of one or more communication flows affecting the preference value.

3. The method of claim 2 further comprising including a communication flow allocated to an access technology in the bundle linked to a preference value of the access technology.

4. The method of claim 2 further comprising updating a preference value when a communication flow is allocated to the access technology to which the preference value refers.

5. The method of claim 2 further comprising updating a preference value when a communication flow in the bundle linked to the preference value is ended or terminated.

6. The method of claim 1 further comprising associating the one or more preference values with one or more information qualifiers indicating at least one of a condition, a requirement, a lack of corresponding conditions or a lack of corresponding requirements, associated with the communication flows for allocation to the access technology.

7. The method of claim 1 further comprising associating the one or more preference values with one or more information qualifiers indicating at least one of a particular condition and a particular requirement under which the one or more preference values are relevant.

8. The method of claim 1 further comprising executing a preliminary candidate allocation for all communication flows.

9. The method of claim 8 further comprising associating a preliminary candidate allocation with a preliminary candidate preference value update.

10. The method of claim 8 further comprising determining, over the available access technologies, a greatest preference value increase of preliminary candidate update for each communication flow or each pair of communication flows.

11. The method of claim 10 further comprising:
    ordering the communication flows according to their greatest preference value increase; and
    sequentially allocating the communication flows to the access technologies in sequence of the ordering.

12. The method of claim 1 further comprising selecting the access technology based on the preference values of communication flows associated with different user terminals or Personal Area Networks (PANs).

13. Access selection equipment for allocating one or more communication flows to one or more of a plurality of access technologies, the access selection equipment comprising:
    a processor configured to process one or more preference values determined for each of the plurality of access technologies; and memory configured to store the one or more determined preference values, wherein the preference values reflect whether it is advantageous to allocate additional communication flows to the access technology.

14. The access selection equipment of claim 13 further comprising an input configured to receive at least one of an allocation policy or a preference value.

15. The access selection equipment of claim 13 further comprising an input configured to receive additional access selection criteria.

16. The access selection equipment of claim 13 wherein the memory is further configured to store a preference value linked to a bundle of one or more communication flows affecting the preference value.

17. The access selection equipment of claim 16 wherein the memory is further configured to include a communication flow allocated to an access technology in the bundle linked to a preference value of the access technology.

18. The access selection equipment of claim 16 wherein the processor is further configured to update a preference value when a communication flow is allocated to the access technology to which the preference value refers.

19. The access selection equipment of claim 16 wherein the processor is further configured to update a preference value when a communication flow in the bundle linked to the preference value is ended or terminated.

20. The access selection equipment of claim 13 wherein the one or more preference values stored in memory are associated with one or more information qualifiers indicating one or more of a condition, a requirement, a lack of corresponding conditions, or a lack of corresponding requirements, of communication flows for allocation to the access technology.

21. The access selection equipment of claim 13 wherein the one or more preference values stored in memory are associated with one or more information qualifiers indicating one or more of a condition, a requirement, a lack of corresponding conditions, or a lack of corresponding requirements, under which the one or more preference values are relevant.

22. The access selection equipment of claim 13 wherein the processor is configured to execute a preliminary candidate allocation for all communication flows.

23. The access selection equipment of claim 22 wherein the processor is further configured to accompany the preliminary candidate allocation by a preliminary candidate preference value update.

24. The access selection equipment of claim 22 wherein the processor is further configured to determine a greatest preference value increase of preliminary candidate update over the available access technologies for each communication flow, or for each pair of communication flows.

25. The access selection equipment of claim 24 wherein the processor is further configured to:
    order the communication flows according to their greatest preference value increase; and
    sequentially allocate the communication flows to access technologies in sequence of the ordering.

26. The access selection equipment of claim 13 wherein the processor is further configured to operate on the preference values of communication flows of different user terminals or Personal Area Networks (PANs).

27. A communications system comprising:
    two or more user terminals or Personal Area Networks (PANs);
    two or more access networks; and
    access selection equipment configured to allocate communication flows of the two or more user terminals or PANs to at least one of the access networks, and comprising a processor configured to operate on preference values of the one or more communication flows of the user terminals or PANs.

* * * * *

UNITED STATES PATENT AND TRADEMARK OFFICE
CERTIFICATE OF CORRECTION

PATENT NO. : 8,400,914 B2  Page 1 of 1
APPLICATION NO. : 12/439465
DATED : March 19, 2013
INVENTOR(S) : Sachs et al.

It is certified that error appears in the above-identified patent and that said Letters Patent is hereby corrected as shown below:

In the Specification

In Column 7, Line 25, delete "<<$A_5$>>." and insert -- <<$A_5$>>. --, therefor.

In Column 7, Line 46, delete "As." and insert -- $A_5$. --, therefor.

In Column 9, Line 63, delete "PAT," and insert -- RAT, --, therefor.

Signed and Sealed this
Eighteenth Day of June, 2013

Teresa Stanek Rea
*Acting Director of the United States Patent and Trademark Office*